(12) United States Patent
Satish et al.

(10) Patent No.: US 11,061,736 B2
(45) Date of Patent: Jul. 13, 2021

(54) MULTIPLE PARALLEL REDUCER TYPES IN A SINGLE MAP-REDUCE JOB

(71) Applicant: International Business Machines Corporation, Armonk, NY (US)

(72) Inventors: Umesh C. Satish, Livermore, CA (US); Victor Tkachenko, Martinez, CA (US)

(73) Assignee: International Business Machines Corporation, Armonk, NY (US)

( * ) Notice: Subject to any disclaimer, the term of this patent is extended or adjusted under 35 U.S.C. 154(b) by 1298 days.

(21) Appl. No.: 15/240,192

(22) Filed: Aug. 18, 2016

(65) Prior Publication Data

US 2018/0052899 A1 Feb. 22, 2018

(51) Int. Cl.
*G06F 17/00* (2019.01)
*G06F 9/50* (2006.01)

(52) U.S. Cl.
CPC ................................. *G06F 9/5066* (2013.01)

(58) Field of Classification Search
CPC .................................................. G06F 9/5066
See application file for complete search history.

(56) References Cited

U.S. PATENT DOCUMENTS

| | | | |
|---|---|---|---|
| 8,959,138 B2 | 2/2015 | Narang et al. | |
| 8,984,516 B2 | 3/2015 | Gupta et al. | |
| 9,147,373 B2 | 9/2015 | Cunningham et al. | |
| 2008/0086442 A1 | 4/2008 | Dasdan et al. | |
| 2012/0254193 A1 | 10/2012 | Chattopadhyay et al. | |
| 2014/0055496 A1 | 2/2014 | Cunningham et al. | |
| 2016/0085810 A1* | 3/2016 | de Castro Alves | ........................ G06F 16/24568 707/752 |
| 2016/0098472 A1 | 4/2016 | Appleton | |

OTHER PUBLICATIONS

Li, Feng et al. Distributed Data Management Using MapReduce. Jan. 2014. ACM Computing Survey. 31:1-42.*
McNabb et al. 2007. "Parallel PSO Using MapReduce." 2007. IEEE.*

* cited by examiner

*Primary Examiner* — Tuankhanh D Phan
(74) *Attorney, Agent, or Firm* — William H. Hartwell

(57) ABSTRACT

Different types of event data generated by a computing platform are transformed in parallel by a group of reducers during a reduce phase of a single map-reduce job into a set of different computed outputs that impose different types of storage formats based upon differing data characteristics of the respective different computed outputs. The set of different computed outputs are written to storage in parallel by the group of reducers during the reduce phase of the single map-reduce job according to the imposed different types of storage formats.

20 Claims, 5 Drawing Sheets

MULTIPLE PARALLEL REDUCER TYPES IN A SINGLE MAP-REDUCE JOB

BACKGROUND

The present invention relates to map-reduce processing. More particularly, the present invention relates to multiple parallel reducer types in a single map-reduce job.

Map-reduce is a technology that compartmentalizes processing of large data sets into jobs. Map-reduce technology is used to derive new usable information/data from these large data sets.

SUMMARY

A computer-implemented method includes transforming, in parallel by a plurality of reducers during a reduce phase of a single map-reduce job and as specified by the single map-reduce job, different types of event data generated by a computing platform into a plurality of different computed outputs that impose different types of storage formats based upon differing data characteristics of the respective different computed outputs; and writing to storage, in parallel by the plurality of reducers during the reduce phase of the single map-reduce job, the plurality of different computed outputs according to the imposed different types of storage formats.

A system that performs the computer-implemented method and a computer program product that causes a computer to perform the computer-implemented method are also described.

DETAILED DESCRIPTION

Figure 1:
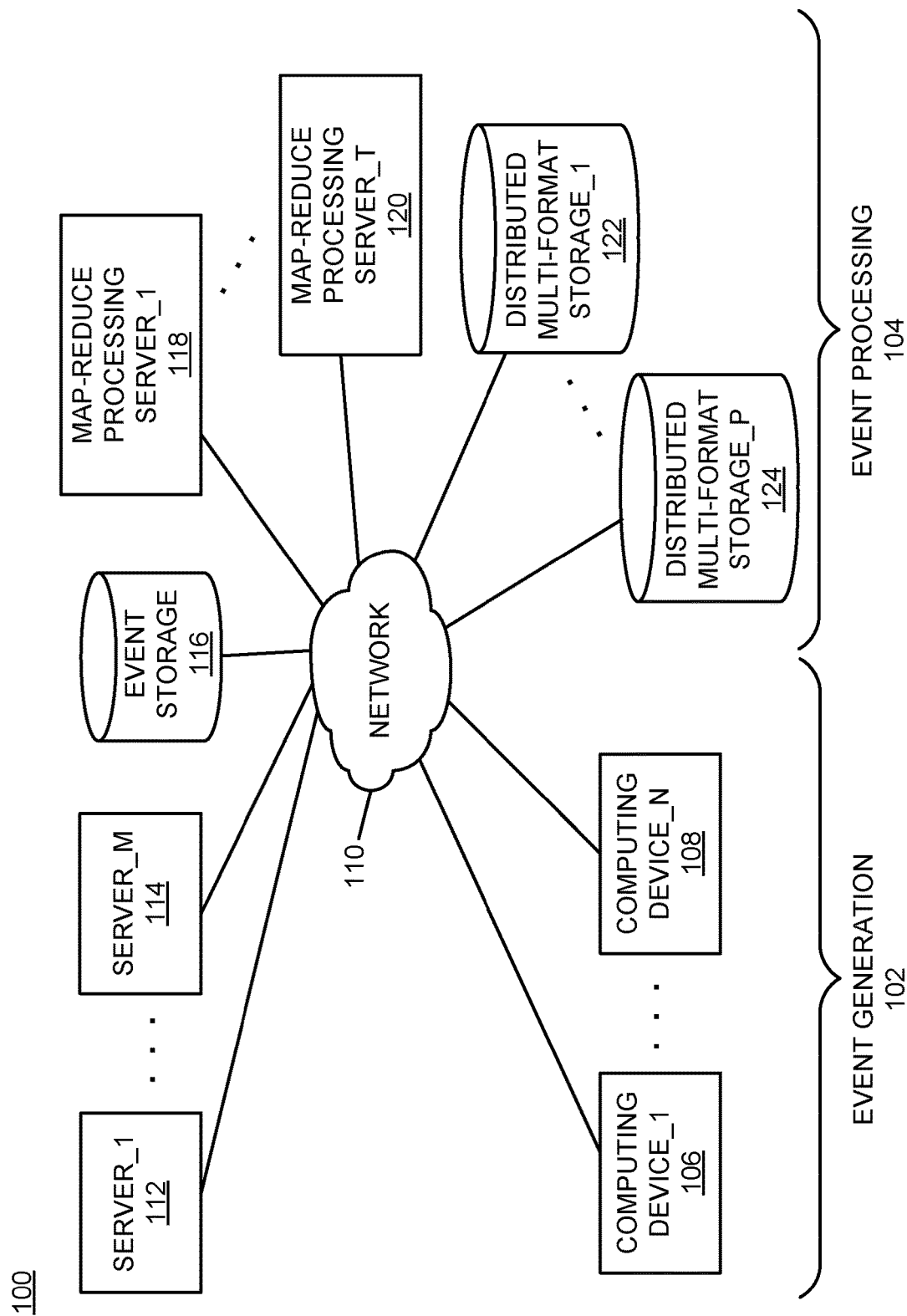
FIG. 1 is a block diagram of an example of an implementation of a system for implementing multiple parallel reducer types in a single map-reduce job according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides multiple parallel reducer types in a single map-reduce job. The present technology solves a recognized map-reduce problem by providing new technology that includes a new form of parallel computational processing that allows a single map-reduce job to specify and generate different types of outputs in parallel. Where prior technologies required multiple sequentially-executed map-reduce jobs to achieve outputs of different types, the present technology allows concurrent parallelized generation of output to different output types and storage formats within the same map-reduce job. As such, improved real-time operational efficiency of the host computing platform may be obtained, along with improved computational processing and throughput to more-efficiently derive different types of new information/data from very large data sets.

The technology described herein operates by transforming, in parallel by a plurality of reducers during a reduce phase of a single map-reduce job and as specified by the single map-reduce job, different types of event data generated by a computing platform into a plurality of different computed outputs that impose different types of storage formats based upon differing data characteristics of the respective different computed outputs; and writing to storage, in parallel by the plurality of reducers during the reduce phase of the single map-reduce job, the plurality of different computed outputs according to the imposed different types of storage formats.

Map-reduce processing may be applied to implement a variety of different programmatic processing tasks. For example, map-reduce processing may be used to post-process data records generated by user traffic and activities on websites (e.g., website events) or other platforms (e.g., application servers). Example websites include department store websites and other high-volume websites. Website events may include webpage view events, user registration events, updates to user registrations, item purchase events, log events, and other events that occur randomly over time.

These types of events may be captured in real time to data records and stored in compressed event files (e.g., Zip files) for later and/or contemporaneous programmatic processing. A new compressed event file may be created, filled with real-time website event records, and stored periodically based upon storage and post-processing objectives. For example, a new compressed event file may be created for each interval of time (e.g., for each five (5) minute interval during a given day of activity on a website) or in response to certain thresholds of events that may be managed within a given compressed event file (e.g., events counts that accumulate to a file partition size, etc.). These compressed event files may then be processed contemporaneously and/or at a later time for a variety of information processing purposes, as described herein.

As described in more detail below, differences in volume and differences in informational processing and storage requirements associated with different types of website events result in different types of storage formats being more suitable for the data/output that is processed and derived/transformed from these events. The technology described herein facilitates parallel processing for storage of the resulting output to different storage formats based upon differing data characteristics of the respective different resulting outputs within a single map-reduce job, and improves real-time processing of data using map-reduce technology.

The map-reduce processing described herein involves three phases of programmatic activities: (1) a map phase, (2) a shuffle and sort phase, and (3) a parallelized reduce phase. The parallelized reduce phase implements multiple reducers that perform the processing of the parallelized reduce phase. Each reducer may be configured to write one type of computed output selected from a set of configurable/programmable different types of computed output within a single map-reduce job. The different types of computed outputs may impose different types of storage formats based upon differing data characteristics of the respective different computed outputs by the respective reducer. As such, the technology described herein may be utilized to improve real-time processing of event data and real-time creation of computed result data using map-reduce technology. A map-reduce job as described herein that operates with a parallelized reduce phase is alternatively termed and considered a "parallelized map-reduce job" herein for brevity and use in the drawings, and to distinguish conventional forms of map-reduce technologies.

The map phase of map-reduce processing is responsible for fetching data inputs/records line by line (e.g., from compressed event files), parsing each incoming line, and grouping the output of the map phase based upon a particular key in a key-value pair format. The shuffle and sort phase is responsible for shuffling the outputted key-value pairs of the map phase based upon the key, and sorting the shuffled data so that data with the same key values are grouped together. The new parallelized reduce phase described herein obtains the data that is sorted/grouped based upon the same keys, and performs the specified programmatic processing (computations, aggregations, etc.) that transforms the obtained data in parallel into new usable information/data outputs from the original large data sets. The new parallelized reduce phase outputs the new usable information/data in parallel by multiple reducers that each write to different storage types as dictated by the particular type of resulting data and stores the resulting data to storage. The parallel routing of the reduced data to different storage types based upon a variety of criteria is described further below.

The jobs may include programmatic processing as specified by a developer (e.g., a website developer), such as programmatic processing to derive new usable information from the large sets of data and to persist the resulting information to storage. For purposes of example, among other uses, the programmatic processing may include data mining of captured website events to identify processing actions that occur by individual web page users over time, to manage input that is received via web pages, and other complex processing of events that occur within networked computing systems. However, it should be noted that the programmatic processing is not limited to a particular processing domain, and that the programmatic processing may alternatively include data mining to identify a number of occurrences of a pattern or word in a large set of data, pattern recognition across large data sets, and other forms of processing of very large data sets.

The following use cases provide examples of different types of storage requirements that may result from processing of events, such as website events, and certain of the criteria (data characteristics) usable to route reduced data to different storage types in parallel. These and other different types of output sinks/types may be processed in parallel using the new parallelized reduce phase described herein.

Within a first use case, if the developer requests a report related to website event processing that includes items purchased and a quantity of each item purchased for a particular hour of a day, then the number of records may be a few thousand records because the request is scoped to only one hour. In this case, a selected text output sink, "TextFileOutputFormat," may be utilized because the data is not be considered to be "huge" data in view of the limited duration of data that is being processed (e.g., only one hour). An advantage of returning the report as a text file in this case is that the developer will have the report in the user-readable form and he/she would not have to do any additional processing to view/utilize the data. As such, based upon the data characteristics of the data in this case, the text file provides more utility.

Within a second use case, the number of events associated with markup language (ML) tag data, such as page views per day may be considered huge data. There may be a significant number of events coming in for page views per client. Storing this type of huge data in a text file may be costly because it may consume excessive available space within external memory. Additionally, processing of this type of huge data (e.g., searching for a particular page) may also consume a significant amount of processor cycles/time if it is saved in a text file. In this case, it may be more beneficial to save this type of huge data in sequence files, with a "SequenceFileOutputFormat" specified, because sequence files may save space relative to text files, and fetching the data may be simplified relative to text files. As such, based upon the data characteristics of the data in this case, the sequence file provides more utility.

Within a third use case, there may be an enormous number of users that register on a retail website, such as a website for a major department store. Managing the registration website events for these types of large commercial entities may be challenging and potentially difficult if the registration data is saved in a text file or in a sequence file or, for that matter, within any type of file. Additionally, because the registration data may be updated regularly (e.g., whenever the user desires to change information within their registration profile), it may be difficult to manage this type of data and changes to the data if the data is in any type of file. Registration data may be useful, for example, to calculate new users over time for a given website. This type of registration data may be best handled if stored in a database or similar format, with a "DatabaseTableOutputFormat" specified. Querying or updating the details for a particular registrant may be more efficiently performed using a database table when compared to searching or updating the registrant values in a huge text file or a sequence file. As such, based upon the data characteristics of the data in this case, a database table provides more utility.

As introduced above, the technology described herein manages processing of these and other different storage requirements and storage formats/types in parallel based upon the data characteristics of the data. The subject matter described herein provides flexibility to reducers that may significantly improve the performance of the map-reduce program writes to multiple different file/storage types. A single map-reduce job may be used to output the data from the reducers to different data storage formats in parallel from within the single map-reduce job. A user may intend to write the reducer output to different storage formats, such as text files, sequence files, optical character recognition (ORC) files, text files, binary files, database tables, etc. As such, the present technology provides a programmatic architecture with multiple storage types and devices that may be used interchangeably and in parallel within a single map-reduce job. As the amount of data belonging to different types of data varies, the storage types may also be different for each of the types of data to accommodate the varying storage and processing requirements of the particular parallelized map-reduce job.

Using the technology described herein, different tag and event data may be written to different sink types using a single map-reduce job. For example, within a single map-reduce job, registration data may be written to database tables, page view data may be written to sequence files, and any other tag data with a lesser number of events may be written to text files. As another example, if registration data needs to be updated and a new page view entry needs to be inserted, both the cases may be processed in a single map-reduce. The flexibility provided to the reduce phase by the technology described herein allows data of varying event types to be processed in parallel and routed to storage in parallel according to the specifics/characteristics of the data itself (e.g., volume, type, etc.), and thereby improves processing capabilities of the underlying processing platform itself. Other example sink types include HBASE® database management software, Oracle® database (DB), Aster® database management software, and structured query language database (SQLDB). Many other possible sink types may be used, and use of all such sink types is considered to be within the scope of the present description. The description that follows details use of text files, sequence files, and database tables for ease of reference and example. It is understood that any of the various sink types may be utilized as appropriate for the given implementation.

The present technology may be implemented within a variety of computational processing platforms. One example computational processing platform is known as Hadoop® database software. Hadoop® database software is a platform that provides a reliable, scalable, and distributed computing framework. Hadoop® database software has two primary components: Hadoop® distributed file system (HDFS), and map-reduce processing capabilities. HDFS has a capacity of storing very large files, which may include files of hundreds of megabytes, gigabytes, or even terabytes in size. Data in HDFS may be stored in blocks and the size of each block may be defaulted to either sixty four megabytes (64MB) or one hundred and twenty eight (128MB). A file is divided into a number of blocks that are stored in HDFS.

As examples of implementation of the present technology, and using Hadoop® database software for ease of description, there are two different techniques for implementation of the present technology within Hadoop® database software. A new class called "MultipleReduce" may be utilized to establish and control different types of reducers that are configured to each generate one computed output in parallel. Alternatively, a "MultipleOutput" class may be established to support multiple types of reducers that each may generate and output computed results in parallel.

Based upon the number of data types being processed in parallel, as set by the MultipleReduce class, a job tracker process may be implemented to utilize a random assignment generator to configure each of the number of reducers specified by the map-reduce job to output one of the specified different computed outputs of the map-reduce job. The job tracker process may then launch the configured reducers. For example, if three types of output data are specified in MultipleReduce class (e.g., TextFileOutputFormat, SequenceFileOutputFormat, and DatabaseTableOutputFormat), and if the job tracker launches eight (8) reducers, then the job tracker may run a random assignment generator to assign and distribute the different types of data output to the different launched reducers. The random assignment generator algorithm may be implemented so that each type of output data is assigned to one reducer, and each reducer may process the assigned type of data from the specified output data types of the map-reduce job. Multiple reducers may also be configured to process similar types of data from the specified output data types. To further the example from above, based upon the results of the random assignment generator for the given map-reduce job, of the eight (8) launched reducers: two (2) of the reducers may be set to write data to text files, two (2) of the reducers may be set to write data to sequence files, and four (4) of the reducers may be set to write data to database tables. Other variations of reducers processing similar and different types of computed outputs in parallel are possible based upon the calculations specified for the particular map-reduce job, and all such variations are considered to be within the scope of the present description.

Parallel calculations may be specified by the map-reduce job to be performed in the reduce phase based upon incoming event data. A determination may be performed to identify which data characteristics are associated with computed output of each requested parallel calculation. These parallel calculations may then be assigned to be performed by the respective reducers that were randomly assigned and then configured with the respective output data format/type that results from the specified parallel calculations. In this manner, a programmatic mapping may be established between the requested parallel calculations and the reducers assigned to support the appropriate computed outputs. Work may be distributed across the reducers to generate the different types of computed output in parallel by the configured reducers as a set. Further, the reducers may output the resulting data to different types of storage formats/devices as a set in parallel to implement a parallelized distributed computational platform that may improve the computational throughput capabilities of map-reduce technology.

For purposes of description herein, the job tracker process is understood to directly or indirectly control parallel processing of parallelized map-reduce jobs that include the parallelized reduce phase described herein. As such, the job tracker process is alternatively termed and considered a "parallelized job tracker process" herein for brevity and use in the drawings, and to distinguish conventional forms of map-reduce technologies.

It should be noted that conception of the present subject matter resulted from recognition of certain limitations associated with previous map-reduce processing technologies. For example, it was observed that within previous map-reduce infrastructures, conventional reducer's within a given job are only capable of outputting data to one kind of storage/format (e.g., one type of sink). For example, conventional reducers may output data to either a text file, a sequence file, or a database. However, these conventional reducers are not capable of outputting data to different types of data sinks in parallel during a single map-reduce job according to the characteristics of the data itself. If was further observed that these previous limitations on output format (e.g., sink type) to a single output format within a given job caused different output types to have to be generated sequentially using different map-reduce jobs (with a different reducer used in each job). It was determined that these conventional processing limitations prevented efficient expansion of the map-reduce architecture to other types of data processing with varying types of data and quantities of data, and limited real-time throughput of the data that is processed. The present subject matter improves map-reduce technology by providing multiple parallel reducer types in a single map-reduce job, as described above and in more detail below. As such, improved map-reduce processing and real-time data throughput may be obtained through use of the present technology.

Processing performed by the multiple parallel reducer types in a single map-reduce job described herein may be performed in real time to allow prompt processing of different output types from single map-reduce jobs. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for implementing multiple parallel reducer types in a single map-reduce job. The system 100 is illustrated for purposes of description to involve two primary regions of processing, namely an event generation region 102, and an event processing region 104. It is understood that event processing within a system, such as the system 100, may involve huge amounts of data (e.g., millions of event records, trillions of event records, etc.), and that programmatic processing using the parallelized technology described herein is required to perform the processing described herein.

Within the event generation region 102, a computing device_1 106 through a computing device_N 108 communicate via a network 110 with several other devices. The other devices include a server_1 112 through a server_M 114. The server_1 112 through the server_M 114 may include one or more web servers, application servers, or other data server devices that are accessed by the computing device_1 106 through the computing device_N 108.

Within the example of web servers, users may use the computing device_1 106 through the computing device_N 108 to access one or more websites hosted by the server_1 112 through the server_M 114. The users may register with the respective websites/servers, may perform web searches, may navigate to multiple different web pages/sites, may make purchase transactions, and may communicate with other users (e.g., via one or more social networks). Many other possible user accesses and actions across one or more websites may occur, as appropriate for a given implementation. Similar analysis is applicable to the example of application servers, data server devices, and other forms of network-accessible computing devices and platforms.

Events may be generated at the respective servers 112 through 114 in response to each user interaction with the respective servers. For example, a page view event may be generated each time a user views a particular web page of a given website. A registration event may be generated each time a user registers with a given website to access or use advanced features of the website. A registration update event may be generated whenever a user updates a registration profile at a website. A purchase transaction event may be generated each time a user performs a purchase transaction with a given website. A log event may be generated routinely by the respective servers and/or in response to certain types of events. Many other event types are possible and all are considered within the scope of the present technology.

It is understood that the types and variety of events result in a diverse set of event data. As introduced above, events may be captured in real time to data records and stored in compressed event files (e.g., Zip files) for later and/or contemporaneous programmatic processing. These compressed event files may be stored in one or more storage devices, shown generally as an event storage device 116 within the system 100. It is understood that the event storage device 116 may also be parallelized and distributed to allow compressed event files to be efficiently stored in real time as events are generated at/by the servers 112 through 114.

With the description above of compressed event files generated within the event generation region 102, the event processing region 104 of the system 100 will now be described. Within the event processing region 104, the specified programmatic processing (computations, aggregations, etc.) may be performed as introduced above and as described in more detail below to transform the event data and derive new usable information/data from the original large data sets, output the new usable information/data in parallel to different storage types as dictated by the particular type of resulting data, and store the resulting data to storage. For example, a registration event must be separated/partitioned from other event types and processed to create a new registration profile for the respective user, and the new registration profile may be stored into a database type of record to allow efficient management of the registration profile over time. As described above, other event types may be separated/partitioned from other event types, processed differently, and routed to different types of storage/formats, as appropriate for the respective event types.

A map-reduce processing server_1 118 through a map-reduce processing server_T 120 are illustrated. The map-reduce processing server_1 118 through the map-reduce processing server_T 120 may each implement the multiple parallel reducer types in a single map-reduce job described herein. As such, the respective map-reduce processing servers 118 through 120 may each execute separate map-reduce jobs and/or may collaborate on a single map-reduce job, as appropriate for the given implementation.

The map-reduce processing servers 118 through 120 generate new usable information from the processed events and store the resulting new data to one or more of a distributed multi-format storage device_1 122 through a distributed multi-format storage device_P 124. As described above and in more detail below, different types of data may be more efficiently managed and processed in different storage types/formats. For example, the distributed multi-format storage devices 122 through 124 may include relational databases, object databases, network accessible storage (NAS) devices, or any other storage type of device appropriate for a given implementation. As such, the distributed multi-format storage devices 122 through 124 provide a diverse set of storage format capabilities, and may be specifically configured as appropriate for a given implementation, As will be described in more detail below in association with FIG. 2 through FIG. 5, the map-reduce processing server_1 118 through the map-reduce processing server_T 120 may each implement multiple reducer types that are each configured to generate a different type of computed output in parallel in a single map-reduce job. While the devices of the system 100 are provided for ease of description, it should be understood that a variety of possibilities exist for implementation of the present subject matter, and all such possibilities are considered within the scope of the present subject matter.

The network 110 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
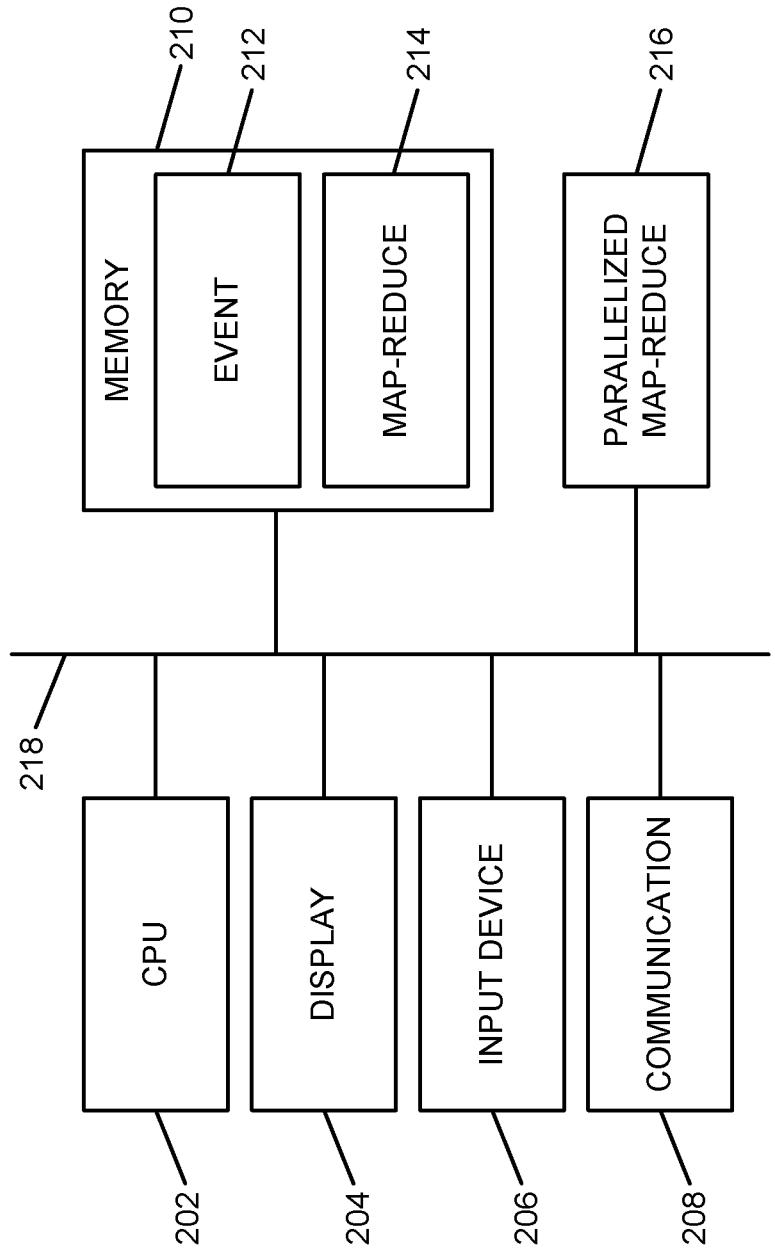
FIG. 2 is a block diagram of an example of an implementation of a core processing module capable of implementing multiple parallel reducer types in a single map-reduce job according to an embodiment of the present subject matter.

FIG. 2 is a block diagram of an example of an implementation of a core processing module 200 capable of implementing multiple parallel reducer types in a single map-reduce job. The core processing module 200 may be associated with each of the map-reduce processing server_1 118 through the map-reduce processing server_T 120, as appropriate for a given implementation. It is understood that certain portions of the core processing module 200 may be implemented by the other devices described in association with the system 100 of FIG. 1. As such, the core processing module 200 is described generally herein, though it is understood that many variations on implementation of the components within the core processing module 200 are possible and all such variations are within the scope of the present subject matter. Additionally, the core processing module 200 may be implemented as an embedded processing device with circuitry designed specifically to perform the processing described herein as appropriate for a given implementation.

Further, the core processing module 200 may provide different and complementary processing of multiple parallel reducer types in a single map-reduce job in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes an event area 212 that provides processing and storage space for event records within the core processing module 200. A map-reduce area 214 provides processing and storage space for performance of single map-reduce jobs that utilize multiple parallel reducer types in parallel.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A parallelized map-reduce module 216 is also illustrated. The parallelized map-reduce module 216 provides multiple reducers that collectively provide parallel reduce operations to different computed output formats during a reduce phase of a single map-reduce job for the core processing module 200, as described above and in more detail below. The parallelized map-reduce module 216 implements the automated multiple parallel reducer types in a single map-reduce job of the core processing module 200.

It should also be noted that the parallelized map-reduce module 216 may form a portion of other circuitry described without departure from the scope of the present subject matter. The parallelized map-reduce module 216 may form a portion of an interrupt service routine (ISR), a portion of an operating system, or a portion of an application without departure from the scope of the present subject matter. The parallelized map-reduce module 216 may also include an embedded device with circuitry designed specifically to perform the processing described herein as appropriate for a given implementation.

The CPU 202, the display 204, the input device 206, the communication module 208, the memory 210, and the parallelized map-reduce module 216 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. Accordingly, the core processing module 200 may take many forms and may be associated with many platforms.

Figure 3:
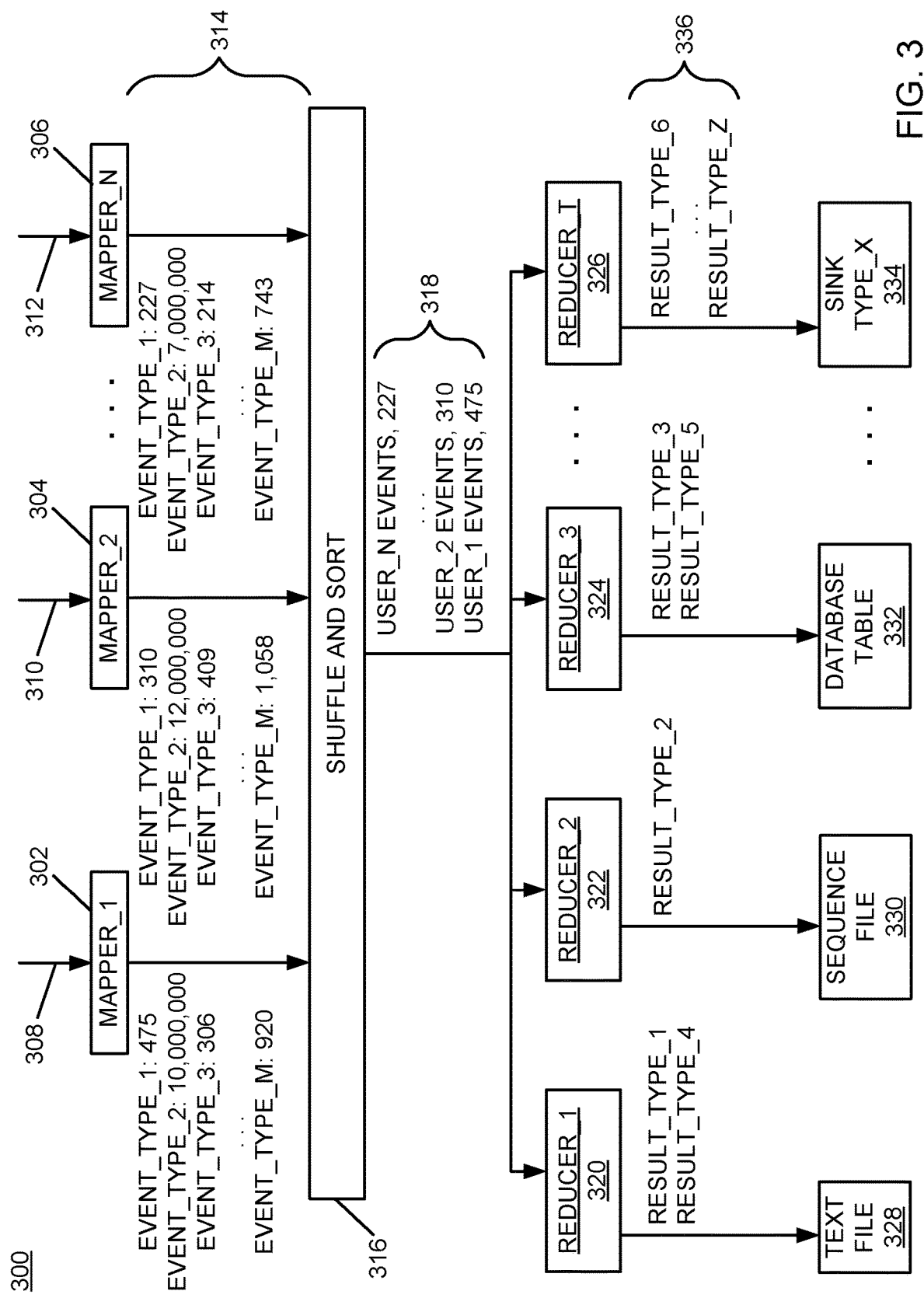
FIG. 3 is a diagram of an example of an implementation of a data processing flow that utilizes multiple reducers that as a set write different types of computed output in parallel within a single map-reduce job according to an embodiment of the present subject matter.

FIG. 3 is diagram of an example of an implementation of a data processing flow 300 that utilizes multiple reducers that as a set write different types of computed output in parallel within a single map-reduce job. The data processing flow 300 may be performed by devices, such as the core processing module 200 within each of the map-reduce processing server_1 118 through the map-reduce processing server_T 120, to implement the automated multiple parallel reducer types in a single map-reduce job associated with the present subject matter.

As described above, web site or other platform event data may be written to event files (e.g., Zip files) that each capture events for a different interval of time (e.g., five (5) minutes). Given that different users may utilize a web site for more than the defined capture interval per event file, user events for each user may be spread across multiple event files. Further, because of the parallelized nature of the map-reduce technology described herein, these multiple event files, and in particular the events for each of the different users, may be processed by different mappers. However, one technical feature of the map-reduce technology describe herein is that all events for each user are grouped within a shuffle and sort phase and are routed as a set to the same reducer. The present technology then operates at each reducer to process a different configured type of event generated by each user's use of the respective website or other platform over time and to collectively write the different events in parallel by the different reducers to different types of storage formats/platforms based upon the differing data characteristics of the respective different computed outputs. With this foundation, the example data processing flow 300 will now be described.

Within FIG. 3, a mapper_1 302, a mapper_2 304, up to a mapper_N 306 are illustrated. It is understood that the number of mappers may be selected as appropriate for the given implementation. Each of the mapper_1 302 through the mapper_N 306 receive streams of input event files (e.g., again Zip files), as represented by the arrow 308, the arrow 310, though the arrow 312, respectively. As described above, these input event files include raw event data from the website or other platform for the configured interval of time. The raw event data may include, among other types of events, web page views, user web page registrations, user web page registration updates, website log records, purchase events, items purchased by users in conjunction with the purchase events, and other types of events.

The mapper_1 302 through the mapper_N 306 process the respective streams of raw input events received within the sets of input event files, and map different event types into sets with event counts associated with the particular events to represents the respective volumes of the respective events. A mapper output region 314 within the example data processing flow 300 depicts sets of events with associated event counts that have been mapped by the mapper_1 302 through the mapper_N 306 from the raw input events in the processed input event files.

As can be seen from FIG. 3, each of the mapper_1 302 through the mapper_N 306 identify events in a set that includes an "EVENT_TYPE_1," an "EVENT_TYPE_2," an "EVENT_TYPE_3," through an "EVENT_TYPE_M." It is understood that the types of events may be significant in number, and the variable "M" may be specified as appropriate for the given implementation.

With respect to the output of the mapper_1 302, the EVENT_TYPE_1 event count field is four hundred and seventy-five (475). Similarly, the EVENT_TYPE_2 event count field is ten million (10,000,000), the EVENT_TYPE_3 event count field is three hundred and six (306), and the EVENT_TYPE_M event count field is nine hundred and twenty (920). With respect to the output of the mapper_2 304, the EVENT_TYPE_1 event count field is three hundred and ten (310). Similarly, the EVENT_TYPE_2 event count field is twelve million (12,000,000), the EVENT_TYPE_3 event count field is four hundred and nine (409), and the EVENT_TYPE_M event count field is one thousand and fifty-eight (1,058). With respect to the output of the mapper_N 306, the EVENT_TYPE_1 event count field is two hundred and twenty-seven (227). Similarly, the EVENT_TYPE_2 event count field is seven million (7,000,000), the EVENT_TYPE_3 event count field is two hundred and fourteen (214), and the EVENT_TYPE_M event count field is seven hundred and forty-three (743).

As can be seen from this example set of numbers, the different types of events have significantly different event counts, with some of the events being very large in number (e.g., website page views). The significantly different number of events may be processed in parallel as described above and in more detail below.

It should be noted at this point in the present example that the different events within each grouping may each be identified using a user identifier that may be used to correlate user events for each particular website or other platform user. Example user identifiers may include user names configured when a user registers for a website or other platform, may include Internet protocol (IP) addresses of computers that access websites or other platforms prior to registration, or may include any other form of unique identifier that may be used to correlate platform events that are generated over time responsive to individual user accesses and navigation within the respective platform(s).

A shuffle and sort module 316 receives the consolidated event output generated within the mapping phase by the mapper_1 302 through the mapper_N 306. The shuffle and sort module 316 collects and groups all events per user and outputs the user groups of events to a set of configured reducers that operate in parallel, as described in more detail below. Additionally, output of the shuffle and sort module 316 may be sorted and grouped with ascending order, and may specify a reducer output data type for each user-generated platform event according to the type and volume of event data across the set of users (up to N users in the present example).

As described above, a job tracker (not shown) may run a random assignment generator to assign the different collected data types to the different reducers, and to configure the respective reducers with their respective assigned computed output type. Once configured, the configured reducers may be launched for use by the map-reduce job. The random assignment generator algorithm may be implemented so that each type of data is assigned to at least one reducer. Multiple reducers may process similar or different types of data/ events. Further, each reducer may output results to one type of storage format, and different reducers may output results to similar or different types of storage formats. A reducer input region 318 is shown within the example data processing flow 300 and depicts collections of all user events (event sets) being passed to all reducers in parallel as output from the shuffle and sort module 316.

FIG. 3 depicts a reducer_1 320, a reducer_2 322, a reducer_3 324, through a reducer_T 326 that each operate in parallel to process user events, and as described may perform programmatic processing (computations, aggregations, etc.) as specified for the particular map-reduce job to create sets of results. By use of the present technology, this programmatic processing at the reducer phase of the single map-reduce job may be performed in parallel by the set of reducers. The number of reducers may be specified and implemented as appropriate for the given implementation.

As can be seen within the reducer input region 318, each reducer receives events from all users, represented within the present example as a user one (USER_1), a user two (USER_2), up to a user "N" (USER_N), and again the ellipsis dots show that the processing constitutes a stream of collected user events that are passed to each of the reducers 320 through 326.

With reference to the depicted "USER_1 EVENTS," these events for purposes of example have accumulated as a result of platform activities of the user one (1) to amount to four hundred and seventy five (475) events. Similarly analysis may be performed for each of the other user event counts, and these are described within the drawing rather than itemized herein to expedite description of the technology described herein.

With correlated user-based sets of events passed as a stream of user event sets to each of the reducer_1 320 through the reducer_T 326, each of the reducers may perform their respective programmatic processing on the input event data, as specified by the particular map-reduce job under which the reducers are operating, and may write results in parallel to different configured types of storage (e.g., "sinks") based upon differing data characteristics of the respective different processed outputs. For purposes of example and not limitation regarding different possible sink/storage format types, the reducer_1 320 is shown to be configured to output to a "TEXT FILE" sink module 328, the reducer_2 322 is shown to be configured to output to a "SEQUENCE FILE" sink module 330, the reducer_3 324 is shown to be configured to output to a "DATABASE TABLE" sink module 332, and the reducer_T 326 is shown to be configured to output to a "SINK TYPE_X" sink module 334. As described above, each of the reducers 320 through 326 may support each of the respective sink types, and as such may each be configured to support any one of the different types of outputs/sinks for any particular parallelized map-reduce job. Further, each of the reducers 320 through 326 may be configured to output to a different type of sink for each different map-reduce job because each reducer may support each of the respective sink types. Different variations of configurability of different reducer types are possible and all such possibilities are considered to be within the scope of the present technology. The sink modules 328 through 334 represent processing modules and devices that include all processing capabilities and infrastructure (e.g., data busses, network interfaces, storage devices, etc.) to store data to the respective type of storage so that all sink types may be processed/written in parallel as instructed by the respective reducer. It is understood that each of the sink modules 328 through 334 also include a respective programmatic entity/object that controls the respective write operations in parallel with the respective other sink modules (e.g., by being executed on a separate hardware processor, such as one processor core of a multi-core integrated circuit/chip or a separate computing device, by being executed by a separate thread in a multi-thread processor, or otherwise as appropriate). Again, any number and types of sinks may be utilized in parallel as appropriate for the given implementation and map-reduce job.

The reducers 320 through 326 process each user's events as a set and sequentially process each user event grouping of results data derived from the programmatic processing of the respective user's events. The reducers 320 through 326 perform the specified programmatic processing identified within the map-reduce job and configured for the respective reducer, and write results for each different user's event types to multiple different sink types that have been configured based upon a type and volume of the respective generated types of data. It should be noted that certain types of results may be routed to the same type of storage sink, and that these types of write operations may also be performed by different reducers in parallel to one or more storage devices.

With reference to the event types described above, results may include a variety of calculated values. For example, where an event type is page views per hour for a given hour, the results may include calculation of page views per hour for each given user from the bulk event data. As another example, where an event type is a registration event, the results may include creation of a set of registration table entries for the particular user (e.g., name, login identifier, password, address, etc.). Many different forms of calculations, aggregations, and other manners of forming new data/results from the bulk event data are possible and all such possibilities are within the scope of the present subject matter.

Within the present example, a result type area 336 identifies the different result types (computed outputs) generated by the reducers 320 through 326. As can be seen from FIG. 3, the reducer_1 320 has been configured to generate computed outputs of result type one (RESULT_TYPE_1) and result type four (RESULT_TYPE_4) that are written to storage by the "TEXT FILE" sink module 328 in parallel with output generated by other reducers. The reducer_2 322 has been configured to generate computed outputs of result type two (RESULT_TYPE_2) that are written to storage by the "SEQUENCE FILE" sink module 330. The reducer_3 324 has been configured to generate computed outputs of result type three (RESULT_TYPE_3) and result type five (RESULT_TYPE_5) that are written to storage by the "DATABASE TABLE" sink module 332. Similarly, the reducer_T 326 has been configured to generate computed outputs of result type six (RESULT_TYPE_6) through result type "Z" (RESULT_TYPE_Z) that are written to storage by the "SINK TYPE_X" sink module 334. As such, each of the reducers 320 through 326 process the groups of user events, generate their respective configured computed outputs in parallel with one another, and write the respective computed outputs to storage in parallel with one another. Again, all outputs may be written in parallel by the respective sink modules 328 through 332.

It should additionally be noted that while individual sinks modules 328 through 334 are illustrated, any of these types of sinks may be implemented as multiple physical storage devices as appropriate for the given implementation, each with a separate data bus and control circuitry to parallelize writing of results data to storage. For example, the "TEXT FILE" sink module 328 may write to a single text file/storage device or may write to multiple text files/storage devices, as appropriate for the given implementation. Similar analysis applies to the sink modules 330, 332, through 334.

It should further be noted that each group of user events may include different event types based upon the activities of the respective user on the computing platform/website. As such, the result types generated by the respective reducers 320 through 326 may be different for each user group of events. Certain events may not exist in certain groups of user events.

Figure 4:
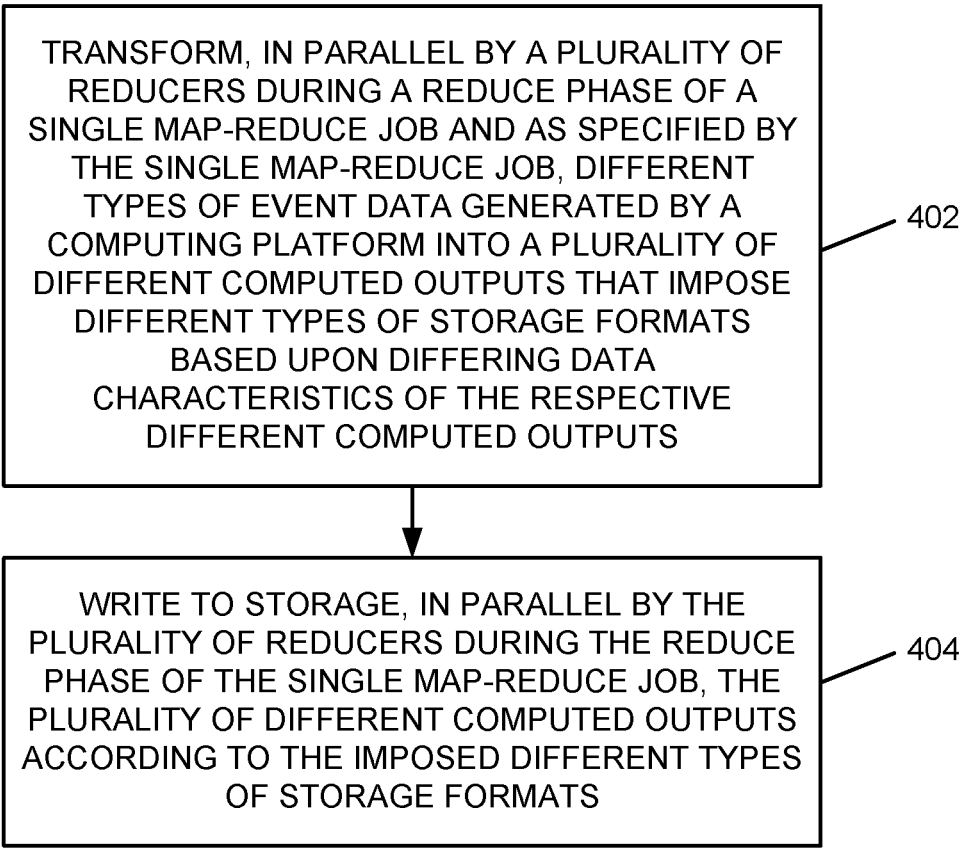
FIG. 4 is a flow chart of an example of an implementation of a process for multiple parallel reducer types in a single map-reduce job according to an embodiment of the present subject matter.
Figure 5:
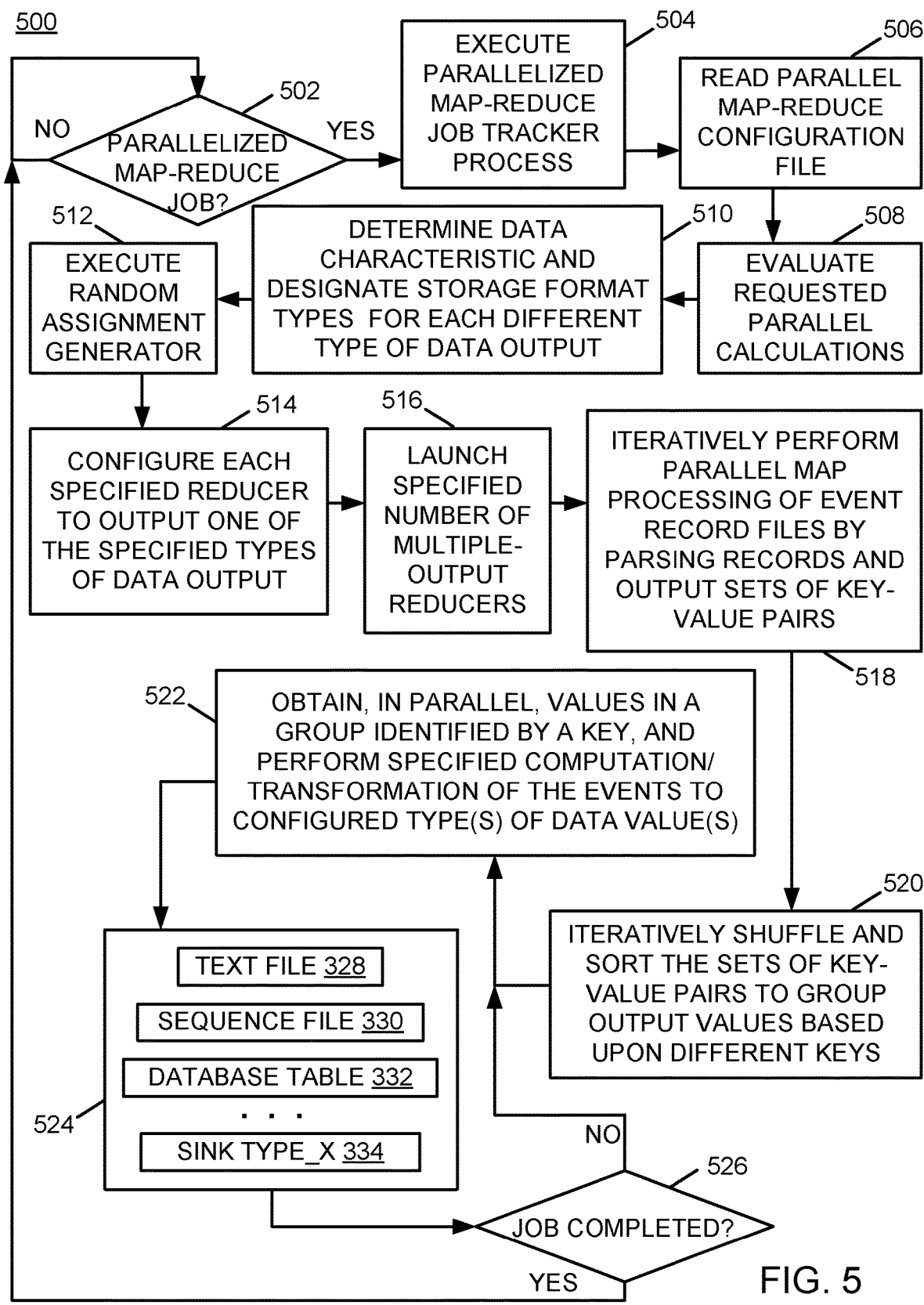
FIG. 5 is a flow chart of an example of an implementation of a process for multiple parallel reducer types in a single map-reduce job that further details configuration and the parallelized reduce phase of the single map-reduce job by a job tracker process according to an embodiment of the present subject matter.

FIG. 4 through FIG. 5 described below represent example processes that may be executed by devices, such as the core processing module 200, to implement the automated multiple parallel reducer types in a single map-reduce job associated with the present subject matter. Many other variations on the example processes are possible and all are considered within the scope of the present subject matter. The example processes may be performed by modules, such as the parallelized map-reduce module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed, or performed within separate threads/processes, without departure from the scope of the present subject matter.

FIG. 4 is a flow chart of an example of an implementation of a process 400 for multiple parallel reducer types in a single map-reduce job. The process 400 represents a computer-implemented method of performing the subject matter described herein. At block 402, the process 400 transforms, in parallel by a plurality of reducers during a reduce phase of a single map-reduce job and as specified by the single map-reduce job, different types of event data generated by a computing platform into a plurality of different computed outputs that impose different types of storage formats based upon differing data characteristics of the respective different computed outputs. At block 404, the process 400 writes to storage, in parallel by the plurality of reducers during the reduce phase of the single map-reduce job, the plurality of different computed outputs according to the imposed different types of storage formats.

FIG. 5 is a flow chart of an example of an implementation of a process 500 for multiple parallel reducer types in a single map-reduce job that further details configuration and the parallelized reduce phase of the single map-reduce job by a job tracker process. The process 500 represents a computer-implemented method of performing the subject matter described herein. At decision point 502, the process 500 makes a determination as to whether to initiate processing of a parallelized map-reduce job. As described above, in addition to parallel operations in other phases (e.g., map and reduce), a parallelized map-reduce job performs the reduce phase in parallel using multiple reducers to write to different types of storage formats in parallel according to storage formats imposed by computed outputs of the reduce phase based upon differing data characteristics of the respective different computed outputs.

In response to determining to initiate a parallelized map-reduce job, the process 500 executes a parallelized map-reduce job tracker process at block 504. The processing described hereafter represents parallel processing that may be performed under direct or indirect control of the parallelized map-reduce job tracker. The parallelized map-reduce job tracker process controls the transformation and parallel writing of computed outputs generated by multiple reducers according to different types of storage formats imposed by the different computed outputs. As described above, the computed output/result elements of the different types of data output that impose the different types of storage formats result from different requested parallel calculations specified by the single map-reduce job.

At block 506, the process 500 reads a parallel map-reduce configuration file that specifies a number of reducers to launch and a data characteristic of the respective different computed outputs to be generated in parallel by the single map-reduce job. At block 508, the process 500 evaluates the requested parallel calculations specified by the single map-reduce job. At block 510, the process 500 determines which data characteristic of the differing data characteristics is associated with the respective computed output of each requested parallel calculation and designates a corresponding imposed storage format type for each different type of data output. It should be noted that the processing at block 510 may include designating a corresponding imposed storage format type for each different type of data output according to differing data characteristics of the respective different computed outputs selected from a group consisting of volume of the respective different computed outputs and frequency of updates over time of the respective different computed outputs.

At block 512, the process 500 executes a random assignment generator to randomly distribute the assignment of the different types of data output across the respective reducers. At block 514, the process 500 configures each of the specified number of reducers to output one of the specified different computed outputs. It should be noted that each of the reducers may be configured to process different or similar outputs in parallel with the other reducers. At block 516, the process 500 launches the specified number of reducers, each with the respective configured type of data output. It is understood that the process 500 may additionally launch a set of mappers specified by the parallel map-reduce configuration file, and may launch a shuffle and sort module, though these processing steps are omitted for brevity.

At block 518, the process 500 begins iterative parallel processing of the parallelized map-reduce job. The process 500 performs parallel map processing of event record files by iteratively parsing event records and outputting sets of key-value pairs, as described in detail above at each of the respective mappers 302 through 306. It is understood that this processing may be performed by mappers, such as the mapper_1 302 through the mapper_N 306 also described above, and this processing may be performed under direct or indirect control of the parallelized map-reduce job tracker process. The iterative processing of the event record files associated with block 518 is omitted for brevity and to avoid crowding in the drawing.

It is understood that the event record files may be records generated by a computing platform, such as a website hosting computing platform, application server platform, or other computing platform as appropriate for the given implementation. Further, the event record files may be events generated by and captured in association with execution of the respective computing platform, and may include different markup language tag event data, user registration event data, user navigation event data, user purchase event data, and website log event data generated responsive to a plurality of users using the respective computing platform.

At block 520, the process 500 iteratively shuffles and sorts the sets of key-value pairs to group output values based upon the different keys. It is understood that this processing may be performed by a shuffle and sort module, such as the shuffle and sort module 316 also described above, and this processing may be performed under direct or indirect control of the parallelized map-reduce job tracker process. The iterative processing of the sets of key-value pairs associated with block 520 is omitted for brevity and to avoid crowding in the drawing.

The process 500 then begins iterative processing of the reduce phase of the parallelized map-reduce job. The processing of the reduce phase is presented in more detail to show the iterative processing and writing to different storage types in parallel across the reducers 320 through 326. The processing may be performed by the reducer_1 320 through the reducer_T 326.

As such, at block 522 the process 500 obtains, in parallel, the values of a group identified by a key, and performs the specified computation/transformation of the events in the respective groups to the configured type(s) of data value(s). As described above, each iteration of the reduce-phase processing may have different computed outputs based upon the group events.

At block 524, the process 500 writes, at each reducer, the respective data outputs to storage in parallel based upon the sink/storage type(s) of the computed outputs according to the configured different storage types of storage formats specified to be output by the reducers assigned the respective data types. The sink modules 328 through 334 are again illustrated to denote the parallelized processing provided by the reducers 320 through 326 under the process 500 and the subject matter described herein.

As described above, writing to storage, in parallel, may include writing, in parallel by at least two reducers, at least two of the different computed outputs to different types of storage devices according to the imposed different types of storage formats using at least one of the reducers. Many other variations of assignment to and use of different data types by different reducers are possible, and all such variations are considered to be within the scope of the present description.

In response to completion of the parallel writing of the computed outputs to different types of storage formats at block 524, the process 500 makes a determination at decision point 526 as to whether the parallelized map-reduce job is completed. In response to determining that the parallelized map-reduce job is not completed, the process 500 returns to block 522 and obtains, in parallel, the values in the next group identified by the next key and iterates as described above to transform and write all computed outputs to different storage formats in parallel. Alternatively, in response to determining at decision point 526 that the parallelized map-reduce job is completed, the process 500 returns to decision point 502 and iterates as described above.

As such, the process 500 executes a parallelized job tracker process that configures the parallelized map-reduce platform using a parallel map-reduce configuration file that designates requested parallel calculations and storage formats that the parallelized map-reduce job is to complete. The process 500 configures different reducers to transform the specified different data types to the different computed outputs, and launches the specified number of reducers to perform the parallelized map-reduce job. The process 500 performs parallel processing to transform different types of event data generated by a computing platform into sets of computed outputs of different types that impose different types of storage formats based upon differing data characteristics of the respective different computed outputs. The process 500 writes to storage, also in parallel by the set of reducers, the sets of computed outputs according to the imposed different types of storage formats.

As described above in association with FIG. 1 through FIG. 5, the example systems and processes provide multiple parallel reducer types in a single map-reduce job. Many other variations and additional activities associated with multiple parallel reducer types in a single map-reduce job are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
mapping, in parallel by a plurality of mappers during a map phase of a single map-reduce job, different types of event data generated by a computing platform into respective sets having corresponding key-value pairs;
transforming, in parallel by a plurality of reducers during a reduce phase of the single map-reduce job and as specified by the single map-reduce job, the different types of event data generated by the computing platform into a plurality of different computed outputs based on respective values of the key-value pairs corresponding to the respective sets of the different types of event data, where the plurality of different computed outputs impose different types of storage formats based upon differing data characteristics of the respective different computed outputs; and
writing to storage, in parallel by the plurality of reducers during the reduce phase of the single map-reduce job, the plurality of different computed outputs according to the imposed different types of storage formats.

2. The computer-implemented method of claim 1, where each reducer of the plurality of reducers is configurable to output any of the plurality of different computed outputs, and each reducer of the plurality of reducers is configured to output one of the plurality of different computed outputs.

3. The computer-implemented method of claim 1, where writing to storage, in parallel by the plurality of reducers during the reduce phase of the single map-reduce job, the plurality of different computed outputs according to the imposed different types of storage formats comprises:

writing to different types of storage devices, in parallel by the plurality of reducers, at least two of the different computed outputs according to a respective at least two of the imposed different types of storage formats.

4. The computer-implemented method of claim 1, further comprising, during configuration of the single map-reduce job:
executing a parallelized map-reduce job tracker process that controls the transformation of and the parallel writing to storage of the plurality of different computed outputs according to the imposed different types of storage formats; and
by the parallelized map-reduce job tracker process:
reading a parallel map-reduce configuration file that specifies a number of the plurality of reducers to launch and that specifies each of the plurality of the different computed outputs to be generated in parallel by the single map-reduce job;
configuring each of the specified number of the plurality of reducers to output one of the specified different computed outputs; and
launching the specified number of the plurality of reducers, each configured to output the respective one of the specified different computed outputs.

5. The computer-implemented method of claim 4, where configuring each of the specified number of the plurality of reducers to output one of the specified different computed outputs comprises, by the parallelized map-reduce job tracker process, executing a random assignment generator to randomly distribute assignments of each of the specified different computed outputs across the respective ones of the plurality of reducers.

6. The computer-implemented method of claim 1, where:
the plurality of different computed outputs that impose the different types of storage formats result from different requested parallel calculations specified by the single map-reduce job; and
the differing data characteristics of the respective different computed outputs are selected from a group consisting of a volume, a frequency of updates over time, and informational processing and storage requirements of the respective different computed outputs; and
further comprising:
evaluating the requested parallel calculations specified by the single map-reduce job;
determining which data characteristic of the differing data characteristics is associated with the respective computed output of each requested parallel calculation; and
designating a corresponding imposed storage format type for each different computed output according to the respective determined data characteristic.

7. The computer-implemented method of claim 1, where:
the computing platform comprises a website hosting computing platform; and
the event data generated by the computing platform is selected from a group consisting of markup language tag event data, user registration event data, user navigation event data, user purchase event data, and website log event data generated responsive to a plurality of users using a website hosted by the website hosting computing platform.

8. A system, comprising:
at least one storage device that supports different storage format types; and
at least one processor programmed to:
map, in parallel by a plurality of mappers during a map phase of a single map-reduce job, different types of event data generated by a computing platform into respective sets having corresponding key-value pairs;
transform, in parallel by a plurality of reducers during a reduce phase of the single map-reduce job and as specified by the single map-reduce job, the different types of event data generated by the computing platform into a plurality of different computed outputs based on respective values of the key-value pairs corresponding to the respective sets of the different types of event data, where the plurality of different computed outputs impose different types of storage formats based upon differing data characteristics of the respective different computed outputs; and
write to storage, in parallel by the plurality of reducers during the reduce phase of the single map-reduce job and within the at least one storage device that supports the different storage format types, the plurality of different computed outputs according to the imposed different types of storage formats.

9. The system of claim 8, where each reducer of the plurality of reducers is configurable to output any of the plurality of different computed outputs, and each reducer of the plurality of reducers is configured to output one of the plurality of different computed outputs.

10. The system of claim 8, where the at least one processor is further programmed to, during configuration of the single map-reduce job:
execute a parallelized map-reduce job tracker process that controls the transformation of and the parallel writing to storage of the plurality of different computed outputs according to the imposed different types of storage formats; and
by the parallelized map-reduce job tracker process:
read a parallel map-reduce configuration file that specifies a number of the plurality of reducers to launch and that specifies each of the plurality of the different computed outputs to be generated in parallel by the single map-reduce job;
configure each of the specified number of the plurality of reducers to output one of the specified different computed outputs; and
launch the specified number of the plurality of reducers, each configured to output the respective one of the specified different computed outputs.

11. The system of claim 10, where, in being programmed to configure each of the specified number of the plurality of reducers to output one of the specified different computed outputs, the at least one processor is programmed to, by the parallelized map-reduce job tracker process, execute a random assignment generator to randomly distribute assignments of each of the specified different computed outputs across the respective ones of the plurality of reducers.

12. The system of claim 8, where:
the plurality of different computed outputs that impose the different types of storage formats result from different requested parallel calculations specified by the single map-reduce job; and
the differing data characteristics of the respective different computed outputs are selected from a group consisting of a volume, a frequency of updates over time, and informational processing and storage requirements of the respective different computed outputs; and the at least one processor is further programmed to:
evaluate the requested parallel calculations specified by the single map-reduce job;
determine which data characteristic of the differing data characteristics is associated with the respective computed output of each requested parallel calculation; and
designate a corresponding imposed storage format type for each different computed output according to the respective determined data characteristic.

13. The system of claim 8, where:
the computing platform comprises a website hosting computing platform; and
the event data generated by the computing platform is selected from a group consisting of markup language tag event data, user registration event data, user navigation event data, user purchase event data, and website log event data generated responsive to a plurality of users using a website hosted by the website hosting computing platform.

14. A computer program product, comprising:
a computer readable storage medium having computer readable program code embodied therewith, where the computer readable storage medium is not a transitory signal per se and where the computer readable program code when executed on a computer causes the computer to:
map, in parallel by a plurality of mappers during a map phase of a single map-reduce job, different types of event data generated by a computing platform into respective sets having corresponding key-value pairs;
transform, in parallel by a plurality of reducers during a reduce phase of the single map-reduce job and as specified by the single map-reduce job, the different types of event data generated by the computing platform into a plurality of different computed outputs based on respective values of the key-value pairs corresponding to the respective sets of the different types of event data, where the plurality of different computed outputs impose different types of storage formats based upon differing data characteristics of the respective different computed outputs; and
write to storage, in parallel by the plurality of reducers during the reduce phase of the single map-reduce job, the plurality of different computed outputs according to the imposed different types of storage formats.

15. The computer program product of claim 14, where each reducer of the plurality of reducers is configurable to output any of the plurality of different computed outputs, and each reducer of the plurality of reducers is configured to output one of the plurality of different computed outputs.

16. The computer program product of claim 14, where, in causing the computer to write to storage, in parallel by the plurality of reducers during the reduce phase of the single map-reduce job, the plurality of different computed outputs according to the imposed different types of storage formats, the computer readable program code when executed on the computer causes the computer to:
write to different types of storage devices, in parallel by the plurality of reducers, at least two of the different computed outputs according to a respective at least two of the imposed different types of storage formats.

17. The computer program product of claim 14, where the computer readable program code when executed on the computer further causes the computer to, during configuration of the single map-reduce job:
execute a parallelized map-reduce job tracker process that controls the transformation of and the parallel writing to storage of the plurality of different computed outputs according to the imposed different types of storage formats; and
by the parallelized map-reduce job tracker process:
read a parallel map-reduce configuration file that specifies a number of the plurality of reducers to launch and that specifies each of the plurality of the different computed outputs to be generated in parallel by the single map-reduce job;
configure each of the specified number of the plurality of reducers to output one of the specified different computed outputs; and
launch the specified number of the plurality of reducers, each configured to output the respective one of the specified different computed outputs.

18. The computer program product of claim 17, where, in causing the computer to configure each of the specified number of the plurality of reducers to output one of the specified different computed outputs, the computer readable program code when executed on the computer causes the computer to, by the parallelized map-reduce job tracker process, execute a random assignment generator to randomly distribute assignments of each of the specified different computed outputs across the respective ones of the plurality of reducers.

19. The computer program product of claim 14, where:
the plurality of different computed outputs that impose the different types of storage formats result from different requested parallel calculations specified by the single map-reduce job; and
the differing data characteristics of the respective different computed outputs are selected from a group consisting of a volume, a frequency of updates over time, and informational processing and storage requirements of the respective different computed outputs; and
the computer readable program code when executed on the computer further causes the computer to:
evaluate the requested parallel calculations specified by the single map-reduce job;
determine which data characteristic of the differing data characteristics is associated with the respective computed output of each requested parallel calculation; and
designate a corresponding imposed storage format type for each different computed output according to the respective determined data characteristic.

20. The computer program product of claim 14, where:
the computing platform comprises a website hosting computing platform; and
the event data generated by the computing platform is selected from a group consisting of markup language tag event data, user registration event data, user navigation event data, user purchase event data, and website log event data generated responsive to a plurality of users using a website hosted by the website hosting computing platform.

* * * * *